No. 728,295. PATENTED MAY 19, 1903.
J. REDDING.
BACK PEDALING COASTER BRAKE.
APPLICATION FILED MAY 19, 1902.
NO MODEL. 2 SHEETS—SHEET 1.
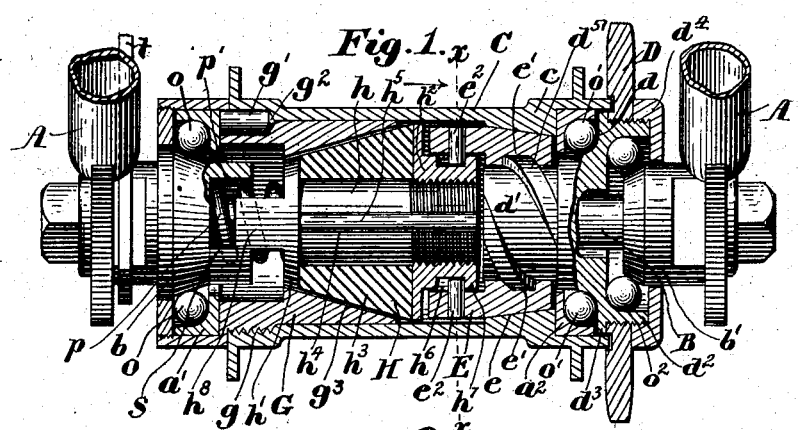
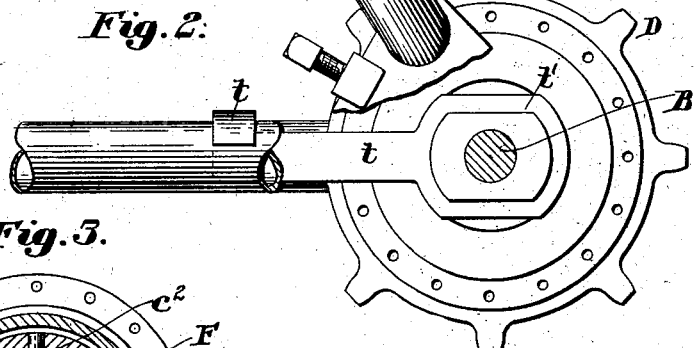
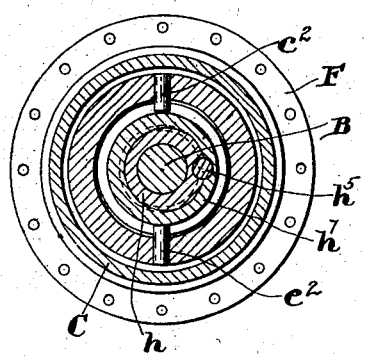
Witnesses:
Walter G. Lombard
Mary A. Kenney
Inventor:
Jacob Redding,
By his Attorney,
T. Hart Anderson No. 728,295. PATENTED MAY 19, 1903.
J. REDDING.
BACK PEDALING COASTER BRAKE.
APPLICATION FILED MAY 19, 1902.
NO MODEL. 2 SHEETS—SHEET 2.
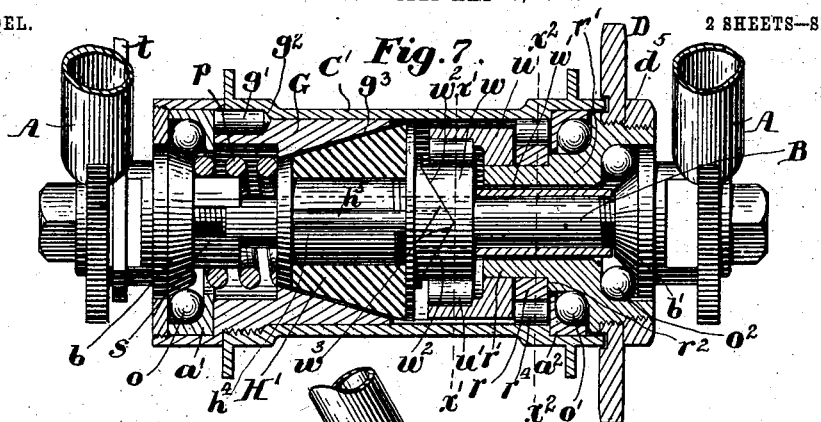
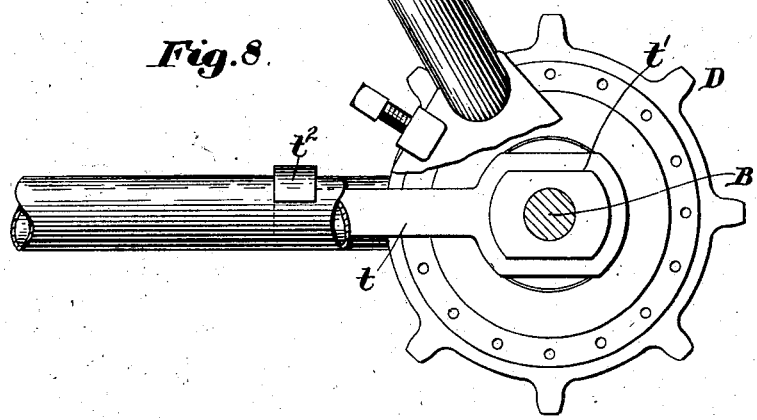
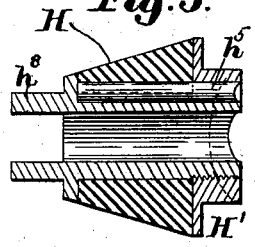
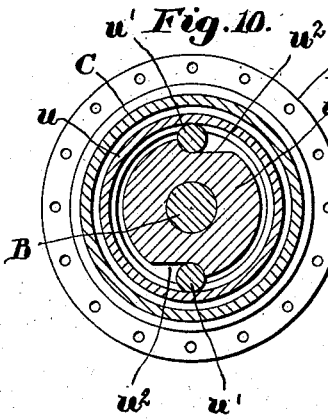
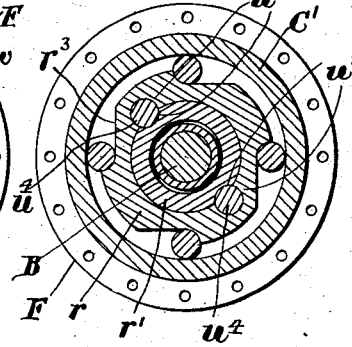
Witnesses:
Walter E. Lombard
Mary A. Kenney
Inventor:
Jacob Redding,
By his Attorney,
A. Hart Anderson No. 728,295. Patented May 19, 1903.

UNITED STATES PATENT OFFICE.

JACOB REDDING, OF CARTHAGE, INDIANA, ASSIGNOR, BY MESNE ASSIGNMENTS, TO THE NEW DEPARTURE MANUFACTURING COMPANY, OF BRISTOL, CONNECTICUT, A CORPORATION.

BACK-PEDALING COASTER-BRAKE.

SPECIFICATION forming part of Letters Patent No. 728,295, dated May 19, 1903.

Application filed May 19, 1902. Serial No. 107,911. (No model.)

*To all whom it may concern:*

Be it known that I, JACOB REDDING, a citizen of the United States, residing at Carthage, in the county of Rush and State of Indiana, have invented new and useful Improvements in Back-Pedaling Coaster-Brakes, of which the following is a specification.

The present invention relates to driving, coasting, and braking mechanism for pedal-operated vehicles, more particularly bicycles, and has for its object the production of simple mechanism controlled by the pedals of the bicycle for positively propelling said bicycle in a forward direction for permitting said bicycle to move over the ground freely, as in descending a grade or by momentum while the feet of the rider remain on the pedals, and to bring into action a brake mechanism for retarding and stopping the advance of the bicycle by back pressure on the pedals.

To the above ends the present invention consists of the devices and combinations of devices, which will be hereinafter described and claimed.

The present invention is shown in the accompanying drawings, wherein—

Figure 1 shows a longitudinal sectional view through the hub of a bicycle-wheel embodying the invention. Fig. 2 shows a portion of the rear forks of a bicycle, illustrating the manner of preventing the movable brake member from turning. Fig. 3 shows a cross-sectional view taken on the dotted line $x\,x$, Fig. 1. Fig. 4 shows the movable brake member in elevation. Fig. 5 is a side view of the brace for the movable brake member. Fig. 6 is an end view of the brace. Fig. 7 is a view similar to Fig. 1, illustrating a modified form of the invention. Fig. 8 is a view similar to Fig. 2. Fig. 9 is a sectional view through the movable brake member. Fig. 10 is a view taken on the line $x'\,x'$, Fig. 7. Fig. 11 is a view taken on the dotted line $x^2\,x^2$, Fig. 7.

Similar letters of reference will be employed throughout the specification and drawings to designate corresponding parts.

In the drawings, A represents a portion of the rear forks of a bicycle, in which is supported in the usual or in any convenient manner the axle B. Upon the axle is mounted the hub C of the rear wheel and the driver D, and within the hub is contained the mechanism for controlling the movements of the bicycle through or by the driver.

The hub C is provided with the cup-rings $a'$ and $a^2$, and upon the axle B are threaded in the usual way cones $b$ and $b'$. A series of balls $o$ are arranged between the cup-ring $a'$ and cone $b$, and a series of balls $o'$ are arranged between the cup-ring $a^2$ and a race $d$ on the driver-sleeve $d'$, while another set of balls $o^2$ is arranged between the cone $b'$ and an internal ball-cup upon the said driver-sleeve, the hub and driver being free to turn upon these balls.

The driver D may consist of the usual sprocket-wheel for use in chain-driven bicycles or any usual form of gear for use in gear-drivers or the so-called "chainless" bicycles. The driver has a connected sleeve $d'$, which is projected within the hub, as clearly shown in Figs. 1 and 7 of the drawings, and which through suitable mechanism acts to connect said driver to the hub to positively propel the wheel in a forward direction or to actuate the brake or permit the free forward movement of the wheel, as in "coasting." This sleeve $d'$ may be integrally formed with the driver D; but it is shown in the drawings as separate therefrom and provided with a threaded extension $d^2$, upon which said driver is threaded, bearing against a shoulder or collar $d^3$ and held in place by a dust-cap $d^4$, as shown in Fig. 1, or a nut $d^5$, as shown in Fig. 7. The driver and its sleeve are normally disconnected from the hub C; but a suitable clutch device is provided whereby upon the forward turning of the driver said driver and its sleeve will be automatically clutched to the hub for positively propelling the wheel in a forward direction. The clutch, as shown in Fig. 1 of the drawings, consists of a tapered socket $c$, formed upon the inner surface of the hub C at the right hand thereof, and the tapered end $e$ of a sleeve E, mounted upon and arranged to move along the driver-sleeve $d'$.

The driver-sleeve $d'$ is intended to move the sleeve E for the purpose of making and breaking clutching contact between the clutch-socket $c$ and its complementary clutch member $e$, and for this purpose said driver-sleeve $d'$ is provided with the spiral threads or ribs $d^{51}$, which engage complementary grooves $e'$ upon the inner face of the sleeve E.

The above arrangement is such that upon forward turning of the driver D and its sleeve $d'$ the spiral connection between said driver-sleeve and the laterally-movable sleeve E will cause said sleeve to move toward the right, as the device is shown in Fig. 1, and thus cause the clutch members $c$ and $e$ to be brought into frictional engagement and lock the driver on the hub for the forward propulsion of the wheel. If during such forward propulsion the rider desires to coast—that is to say, to permit the wheel to advance freely, as in going down a grade—or by momentum, without taking his feet from the pedals—he simply stops or retards the forward turning of the pedals, which stops the driver D and its sleeve $d'$, whereupon the hub turns the sleeve E and the spiral connection $e'$ and $d^5$ will cause said sleeve E to move laterally to the left a sufficient distance to disconnect the clutch $c$ and $e$, and while in this condition the hub will be entirely free, permitting the free movement of the wheel in a forward direction, which has become known in this art as "coasting." The rider during this coasting of the wheel has his feet upon the pedals and by means of the brake mechanism, which will now be described, he may, by simply applying back pressure on the pedals, stop the forward travel of the wheel.

The brake mechanism consists of a fixed member—that is to say, the member with which the movable member of the brake is thrust into engagement to stop the wheel, and which will be called the "fixed" member, notwithstanding that it rotates with the hub C—which comprises a bushing G, fixed into the left-hand end of the hub C by means of the threaded connection $g$ and the pins $g'$, three or more, (only one of which is shown in the drawings,) which engage recesses $g^2$, formed in said bushing G and the hub C. This bushing at its inner end is provided with a tapered brake-socket $g^3$, which is arranged to be engaged by the tapered brake-surface of the movable brake member H.

The movable brake member may consist of a solid piece of steel; but for some purposes it may be deemed desirable to provide said brake member with a braking-surface of leather or fiber, and therefore in the drawings I have shown it as comprising a sleeve $h$, arranged to be freely movable along the axle B and provided at one end with an integral collar $h'$. The opposite end is threaded and receives an interiorly-threaded collar $h^2$, between which and the collar $h'$ the tapered brake-surface $h^3$, of leather or fiber, is clamped. In order to prevent the braking-surface $h^3$ and the collar $h^2$ from turning on the sleeve $h$, said sleeve, braking-surface, and collar may be provided with a groove $h^4$ to receive a key or pin $h^5$.

The movable brake member H is connected with and designed to be actuated by the driver D and its connected sleeve $d'$, it being caused to frictionally engage the brake-socket $g^3$ upon the backward turning of the driver by back pressure applied to the pedals and to be disengaged therefrom upon forward pedaling. To this end the movable brake member in Fig. 1 is connected to and so as to partake of the lateral movements of the laterally-shifting sleeve E, while permitting the free turning of said sleeve, the brake member H being positively held from turning, while permitted to freely move laterally. This connection in Fig. 1 consists of pins $e^2$, fixed in the sleeve E, which engage a groove $h^6$, formed in an extended boss $h^7$ of the collar $h^2$. Projected from the collar $h'$ are the diametrically-disposed lugs $h^8$, which slidingly engage slots or grooves $s$ in the cone $b$. The cone $b$ is prevented from turning under the strains imparted by the movable brake member by means of an arm $t$, provided with a slot $t'$, engaging the squared outer end of said cone and fixed to the frame of the bicycle, as by means of the hook $t^2$ engaging one of the horizontal frame members.

The above arrangement is such that the lateral movement toward the left of the sleeve E, caused by the spiral connection $e'$ and $d^5$ upon the backward turning of the driver D, will cause said sleeve to force the movable brake member H into braking contact with the brake-socket $g^3$ of the hub, thus retarding or stopping the wheel. This braking movement of the movable member H takes place against the force of a coiled spring $p$, which surrounds the axle B and bears at one end against the end of the movable brake member and which is seated at its opposite end in a chamber $p'$, formed in the cone $b$.

In the modified form of the device shown in Figs. 7 to 11, inclusive, the parts in all respects are the same as those just described, with the following exceptions: In this form the spring $p$ surrounds the cone $b$ instead of being seated in a chamber formed in said cone. The laterally-movable sleeve for actuating the brake and connecting the driver-sleeve with the hub C' is omitted and the following mechanism employed instead. The driver-sleeve is connected to and disconnected from the hub by means of a clutch, which I shall call the "driving-clutch," and consists of a roller-clutch comprising a ring $r$, fixed to the driver-sleeve $r'$ against a shoulder $r^2$ and provided with the inclined notches $r^3$, which receive the rollers $r^4$, arranged to lock said ring $r$ and the driver-sleeve to the hub C' when said driver-sleeve shall be turned in one direction and to release said hub when the driver and its sleeve shall be held from turning or when back pressure shall be applied thereto, also to permit the free turning of the hub when coasting, said driving-clutch operating in a manner well known to those skilled in this art, and therefore not necessary to be further described.

A device which I shall call a "brake-actuator" is employed and consists of a block $w$, having a tubular sleeve $w'$ bearing at one end against the cone $b'$, which prevents the lateral movement of said brake-actuator, is mounted to turn upon the axle B and at its inner end is provided with inclined faces $w^2$, formed by a V-shaped notch, which engage corresponding inclined faces $w^3$, formed by a V-shaped projection on the movable brake member H'.

A turning of the brake-actuator will cause the inclined faces to move with relation to each other, and thus impart a lateral movement to the movable brake member H'.

To turn the brake-actuator $w$, there is provided a second clutch, which I shall call the "brake-clutch," whereby it is connected automatically to the driver-sleeve $r'$ upon the backward turning of said sleeve and which comprises a flanged drum $u$, fixed to the inner end of the driver-sleeve $r'$ and inclosing the rollers $u'$, which engage inclined notches $u^2$, formed in the periphery of the brake-actuator $w$.

For the purpose of securing the clutch-ring $r$ and the flanged drum $u$ to the driver-sleeve $r'$ said parts are provided upon their adjacent faces or peripheries with the grooves $u^3$, in which are driven the pins $u^4$. (See Fig. 11.)

The foregoing arrangement is such that a forward turning of the driver D will turn the driver-sleeve $r'$ in a forward direction and cause the driver-clutch to connect said sleeve and driver to the hub C for forward pedaling. If the forward motion of the pedals be stopped or retarded, the hub C' will be freed from the driver and its sleeve, thus permitting the forward travel of the wheel, as in coasting.

A backward turning of the driver will cause the brake-clutch to connect the brake-actuator to the driver-sleeve, which will thereupon turn the brake-actuator and cause the opposing inclined faces $w^2$ and $w^3$ to turn with relation to each other, and thus move the movable brake member H' into contact with the brake-socket $g^3$. Upon the release of back pressure on the pedals the spring $p$ will force the movable brake member toward the right, as shown in Fig. 7, thus releasing the brake and causing the parts to assume their normal position, as shown therein.

The hubs C and C' are provided with the usual flanges F for receiving the spokes, and it will be understood that the bicycles in which my invention may be embodied will be provided with pedals and cranks and suitable connections between such pedals and the drivers for actuating said drivers.

It will be noted that in both forms of my invention the brake is located within the hub, which in outward appearance is substantially the same as the ordinary and usual hub. It will be further noted that in each case the movable member of the brake is brought into action by the relative movement of inclined faces and returned instantly when back pressure is released by a spring.

Having fully described my invention, I claim as new and desire to secure by Letters Patent of the United States—

1. In a coaster-brake, in combination, a wheel-hub, a driver having a connected sleeve projected within the hub, a driving-clutch for connecting said sleeve and hub upon the forward turning of the driver, a brake member carried by the hub, a laterally-movable brake member, and complementary inclined faces for moving said movable brake member into engagement with the brake member on the hub upon the backward turning of the driver, substantially as described.

2. In a coaster-brake, in combination, a driven element and a driving element, a clutch connection between said elements, a brake member fixed to the driven element, a movable brake element operatively connected with the driving element and arranged to be moved in one direction by said driving element and a spring for moving said brake member in the opposite direction, substantially as described.

3. In a coaster-brake, in combination, a wheel-hub, a driver provided with a sleeve projected within the hub, a clutch device for connecting said driver-sleeve with the hub, a brake member fixed to the interior of the hub, a laterally-movable brake member located within the hub and means operated by the driver-sleeve for moving said movable brake member, substantially as described.

4. In a coaster-brake, in combination, a wheel-hub, a driver provided with a sleeve projected within the hub, a clutch member fixed to the hub, a movable clutch-sleeve actuated by the driver-sleeve, a brake member carried by the hub, and a laterally-movable brake member actuated by the clutch-sleeve, substantially as described.

5. In a coaster-brake, in combination, a wheel-hub, a driver provided with a sleeve projected within the hub, a clutch-socket carried by the hub, a brake-socket carried by the hub, a tapered movable brake member, and a movable clutch-sleeve actuated by the driver-sleeve for connecting said driver-sleeve with the hub when said driver-sleeve is turned in one direction and for moving said movable brake member when said driver-sleeve is turned in the opposite direction, substantially as described.

6. In a coaster-brake, in combination, a wheel-hub, a driver having a connected sleeve projected within the hub, a clutch member carried by the hub and a movable tapered brake member, and movable clutch-sleeve mounted upon the driver-sleeve for connecting said driver-sleeve with the hub when moved in one direction and for operating the brake when moved in the opposite direction, and a spiral connection between said driver-sleeve and the clutch-sleeve, substantially as described.

7. In a coaster-brake, in combination, a wheel-hub, a fixed brake-socket carried within said hub, a part fixed to the frame of the wheel, a movable tapered brake member having a sliding connection with such part, a pedal-actuated device for moving said movable brake member in one direction and a spring for moving said brake member in the opposite direction, substantially as described.

Signed by me at said Carthage this 14th day of December, 1901.

JACOB REDDING.

Witnesses:
   JOSEPH Q. HUBBARD,
   PHILANDER WEAVER.